(12) United States Patent
Yamada et al.

(10) Patent No.: US 6,264,398 B1
(45) Date of Patent: Jul. 24, 2001

(54) PROCESS FOR THE RECOVERY OF OIL

(75) Inventors: Hiroshi Yamada, Osaka; Hitoshi Yoshida; Shoichiro Yano, both of Tukuba; Kiyoe Miyagishi, Kanazawa, all of (JP)

(73) Assignees: Yugenkaisha Fams, Sakai; Japan as represented by Director General of Industrial Science and Technology, Tokyo, both of (JP)

( * ) Notice: Subject to any disclaimer, the term of this patent is extended or adjusted under 35 U.S.C. 154(b) by 0 days.

(21) Appl. No.: 09/403,088

(22) PCT Filed: Apr. 16, 1998

(86) PCT No.: PCT/JP98/01734

§ 371 Date: Dec. 9, 1999

§ 102(e) Date: Dec. 9, 1999

(87) PCT Pub. No.: WO98/46530

PCT Pub. Date: Oct. 22, 1998

(30) Foreign Application Priority Data

Apr. 16, 1997 (JP) .................................................. 9-115217

(51) Int. Cl.⁷ ..................................................... E02B 15/04
(52) U.S. Cl. ............................... 405/62; 405/60; 210/925
(58) Field of Search .................... 405/52, 60, 62, 405/63; 210/925, 924, 922

(56) References Cited

U.S. PATENT DOCUMENTS

| | | |
|---|---|---|
| 3,198,731 * | 8/1965 | De Lew et al. ...................... 210/925 |
| 3,265,616 | 8/1966 | Wyllie et al. . |
| 3,457,168 * | 7/1969 | Malmberg et al. ................... 210/925 |
| 3,919,083 * | 11/1975 | O'Sullivan et al. ................. 210/925 |
| 3,977,969 * | 8/1976 | Zall ....................................... 210/925 |
| 4,206,080 * | 6/1980 | Sato et al. ............................ 210/925 |
| 4,497,663 * | 2/1985 | Fisher et al. ......................... 210/925 |
| 5,262,059 * | 11/1993 | Pohl ...................................... 210/925 |
| 5,437,793 * | 8/1995 | Alper ................................... 210/925 |

FOREIGN PATENT DOCUMENTS

| | | | |
|---|---|---|---|
| 2036396 | * | 8/1992 | (CA) ...................................... 405/60 |
| 1484374 | * | 3/1969 | (DE) ...................................... 405/60 |
| 2 208 748 | | 8/1973 | (DE) . |
| 4115749 | * | 11/1992 | (DE) ...................................... 405/62 |
| 50-41354 | | 4/1975 | (JP) . |
| 51-68968 | | 6/1976 | (JP) . |
| 5-309369 | | 11/1993 | (JP) . |
| WO 92/07917 | | 5/1992 | (WO) . |

OTHER PUBLICATIONS

XP 002153868: Japanese Abstract– IINO, JP 50 015006B; Published Jun. 2, 1975.

XP 002153869: Japanese Abstract–Agency of Ind Sci & Technolody, JP 53 113283A, Published Oct. 3, 1978.

* cited by examiner

*Primary Examiner*—William Neuder
*Assistant Examiner*—Frederick L. Lagman
(74) *Attorney, Agent, or Firm*—Foley & Lardner

(57) ABSTRACT

Heavy oil or crude oil spills in sea water are recovered without polluting environment. A natural rubber latex and a coagulant are scattered around lumps of oil spills to coagulate the latex with the coagulant, so that a membrane of the latex is formed around the oil lumps.

8 Claims, No Drawings

PROCESS FOR THE RECOVERY OF OIL

TECHNICAL FIELD

This invention relates to a process for the recovery of oil, for example, recovery of heavy oil or crude oil spills on the sea caused by accidents of tankers, recovery of oil deposits on rocks and seashores, recovery of oils leaked from oil tanks, and recovery and removal of oil deposits in tanks at the time of cleaning thereof.

BACKGROUND ART

Heavy oils or crude oils are occasionally discharged in sea water upon tanker accidents. Heavy oils or crude oils are mixtures of aromatic oils (aroma oils), nephthene oils, paraffin oils, etc. and contain a large amount of the aromatic oils. Because heavy oil or crude oil spills, which have a smaller specific gravity than sea water, initially afloat on a surface of the sea water in the form of lumps. Paraffin oils and naphthene oils having a low viscosity are gradually separated by diffusion from the lumps due to forces of waves or currents. The remaining aromatic oils having a high density sink in the sea. Thus, part of the oil spills deposits on the seashores and oil deposits are adhered to rocks. It is, therefore, difficult to remove the oil deposits.

In addition to a manual method in which oils are collected with an oil fence and manually recovered, processes are known for treating oil spills in which the oils are decomposed with crude oil decomposing bacteria or the oils are mixed with sea water using an emulsifier. The emulsifier and the crude oil decomposing bacteria used as a treatment agent for this purpose serve to convert the oil into fine particles which are easily mixed with the sea water by emulsion and dispersion and to accelerate the spontaneous purification (destroy of oils such as through decomposition by bacteria, and oxidation and vaporization by sunlight). However, such spontaneous purification proceeds so slowly that the known methods are not practical. Additionally, with this method, it is more and more difficult to recover the oil because, in an accident of discharge of a large amount of oil, the oil treating agent diffuses into and is diluted with a non-polluted region with time due to waves and currents. Thus, in practice, it is the general method to collect the discharged oil manually.

Tanker accident is not the sole cause of discharge of heavy oils or crude oils. Discard of waste oils from ships and discharge from oil tanks in harbors also cause such a problem. Similar to the removal of oil deposits on rocks, cleaning of oil deposits on tanks brings about a difficulty.

It is, therefore, an object of the present invention to provide a process which can easily recover oil spills. Another object of the present invention is to provide a process which can recover such oils while minimizing environmental pollution. It is a further object of the present invention to provide a process which can easily remove and recover oil deposits on solid surfaces.

DISCLOSURE OF INVENTION

The present invention is characterized in that a latex and a coagulant thereof are separately scattered on water containing an oil to diffuse the latex around the oil or in that the latex is coagulated by the coagulant to form a coagulated latex membrane around the oil in the water.

As the latex, there may be used a synthetic rubber latex and a hydrophilic polymer emulsion, such as polyvinyl acetate or polyvinyl alcohol, in addition to a natural rubber latex. The latex is a hydrophilic colloid solution in which a highly polymerized compound is dispersed in water as a dispersing medium. It is preferred that the polymer emulsion be prepared by emulsion polymerization for reasons that the product is in the form of an emulsion as such, though the present invention is not limited thereto.

The use of a natural rubber latex is most preferred. Such a latex is a colloid containing cis-1,4-isoprene polymer (about 54% by weight; concentration hereinafter is expressed in terms of % by weight), water (about 44%) and a protein (about 2%).

Any coagulant may be used as long as it can coagulate the latex. For example, polyvalent metal ions, polyvalent non-metal ions, organic acids or alkali such as ammonia may be used.

The most preferable coagulant is a salt of Mg or Ca. Magnesium chloride or calcium chloride is particularly preferable because these substances are contained in the environment such as sea water and do not bring about secondary pollution and because they are inexpensive.

The present invention is also characterized in that a lipophilic polymer emulsion gets in contact with oil deposits on solid surfaces such as rocks and tanks to solubilize the oils into the emulsion and in that the emulsion is thereafter coagulated to recover the oils.

The lipophilic polymer emulsion is an emulsion in which water of a discontinuous phase is dispersed into an oil matrix phase. For example, there may be used an emulsion prepared by adding nonylphenol ether and polyoxyethylene alkyl ether each in an amount of 0.2% to a natural rubber latex to impart strong lipophilicity.

The latex, which is a hydrophilic colloid diffuses into the water, when it is scattered around oil spills in sea water through a hose. The scattered latex coagulates by reaction with the coagulant. Because the specific gravity of the solids after the coagulation is smaller than water, a membrane is formed around the oil spills. The latex incorporated into lumps of oil spills does not coagulate as such. However, since water is generally present in the oil lumps, the latex is brought into contact with an interface between the oil and water by the action of waves and is thus coagulated.

The coagulated latex membrane is insoluble in oil but is compatible therewith. Therefore, the latex is collected in the interface between the oil spills and water and deposits on the interface of the oil spills. Since the coagulated latex membrane (hereinafter referred to simply as latex membrane) is low in stickiness, oil spills can be easily recovered. Further, since the latex membrane is lighter than water, the aroma oils are prevented from sedimenting. The oil spills are surrounded by the latex membrane to prevent the dispersion of the oil lumps.

The oil lumps surrounded by the latex membrane have no stickiness and, thus, do not deposit on rocks and sand even when they arrive at seashores. Further, since the water temperature dependency of the coagulation rate of the latex is small, oil spills can be recovered even in winter season or in cold places.

When a natural rubber latex is used, unrecovered latex gradually decomposes spontaneously and does not pollute the environment.

The present invention is mainly utilized for the recovery of oil spills in sea water. Whilst magnesium chloride and calcium chloride to be a coagulant are originally present in sea water, the concentration thereof is so small that the coagulation rate of the latex is very slow. Thus, the scattered latex is unnecessarily diffused to reduce the efficiency.

Therefore, it is necessary to scatter the coagulant.

The coagulant is scattered separately from the latex, for example, by using separate hoses. However, the latex may be mixed with the coagulant in a scattering nozzle. The mixture is scattered at a scattering pressure. In this case, for the purpose of preventing the coagulation of the latex by the coagulant within the nozzle, the concentration of the coagulant is controlled to retard the coagulating power of the coagulant. Alternately, this can be achieved by sufficiently reducing the residence time of the mixture in the nozzle as compared with the time required for the coagulation.

When a salt of Mg or Ca such as magnesium chloride or calcium chloride, which is originally contained in sea water, is used as the coagulant, no environmental pollution is caused.

The latex may be a mixture of a plurality of latices. When a synthetic latex is used, it is advisable to add a decomposition enzyme, in particular a decomposition enzyme for the emulsifier in the latex, since the unrecovered latex is decomposed so that a secondary pollution can be prevented.

A lipophilic polymer emulsion is used for oil deposits on rocks, etc. In such an emulsion, water forms discontinuous phase with the lipophilic substance forming a matrix phase. The oil deposits migrate into the emulsion. The emulsion is then gelled when coagulated with a coagulant. Thus, the oil can be removed from the rock, etc. and recovered.

The present invention can be applied not only to the recovery of crude oils or heavy oils in the sea water but also to any utilization for the recovery of oil spills in water. Further, the present invention can be used not only for the removal and recovery of oil deposits on rocks but also for the removal of oil deposits on, for example, walls of tanks.

In practicing the invention, the latex and the coagulant are scattered from recovery ships, helicopters, etc. after crude oils, etc. are discharged. For example, a tanker may be so constructed as to have a double walled bottom structure and to store the latex and the coagulant separately such that they are able to be discharged, if necessary, through valves. The thus stored latex and the coagulant are discharged into sea water when the tanker comes into a grounding accident and is broken at the bottom thereof, so that the diffusion of the oil spills can be prevented in situ.

The basic Japanese Patent Application No. H9-115217 filed on Apr. 16, 1997 is hereby incorporated in its entirety by reference into the present application.

The present invention will become more fully understood from the detailed description given hereinbelow. However, the detailed description and the specific embodiments are illustrative of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BEST MODE FOR CARRYING OUT THE INVENTION

Examples and experimental examples concerning the recovery of heavy oils will be described hereinbelow but do not limit the invention thereto.

EXAMPLE 1

A stone (in a state where heavy oil deposited on the entire surface of a stone of a weight about 10 kg) fouled as a result of an accident of oil spills from a Russian tanker "Nahotoka" in January, 1997 was collected at the Sanriku seashore and was immersed for 2 seconds in a natural latex of a polymer emulsion. The stone was separated from the emulsion. Then, the surface of the stone was strongly rubbed with a cloth. As a result, a phenomenon was observed in which fine lumps of polymer particles are formed. Thus, sticky layers of the fouling oil were converted into fine agglomerates surrounded by the latex and were able to be easily removed. A brush was also used to easily remove oil in fine recesses. This was an application of unstabilization (flocculation phenomenon) of the latex from a stable state in which destroy of the stable state of the latex was accelerated by dynamic shearing forces without using a coagulant.

In this case, it is preferred that the natural latex be used in conjunction with an emulsifier for reasons that the oil removal efficiency is improved because the natural latex becomes lipophilic.

Experimental Example 1

C-Heavy oil (100 g) was placed on 2 liters of sea water in a 5 liter glass vessel to form a sample. A natural rubber latex (10 cc; solid matter content: about 56%) was added to the vessel from above. The latex was dispersed into the whole sea water so that the sea water became milky white.

Subsequently, 20 g of bittern powder (major component: magnesium chloride) was scattered, then the latex was gradually separated from the sea water and afloat with the C-heavy oil being surrounded therewith, so that the sea water became transparent again after about 220 seconds.

The temperature of the sea water was about 10° C. throughout the above procedure. When the sea water had a temperature of 0 C., it took about 230 seconds until the sea water became transparent again. In the case of 30° C., the time required was about 200 seconds. Thus, the temperature dependency of the time required for forming a latex membrane around the C-heavy oil was low.

The C-heavy oil surrounded by the latex membrane had no stickiness and was able to be easily recovered. Further, since the 100 g of the C-heavy oil was formed into one ball, the fluidity thereof was low. The latex membrane of the ball surface was white and rubber-like. However, since the C-heavy oil located inside was able to see through the membrane, the whole color tone was white-gray-grayish black in spots.

Experimental Example 2

Under the same conditions as above (water temperature: 10° C.), 100 g of heavy oil recovered in the Noto Peninsula (light brown heavy oil spills from a tanker recovered on the sea) was used in place of the C-heavy oil.

In the same manner as above, 10 cc of a natural rubber latex and 20 g of bittern powder (major ingredient: magnesium chloride) were used. When the latex was coagulated, a latex membrane was formed around the recovered oil. The sea water became transparent after about 220 seconds.

As a consequence of the coagulation of the latex membrane, a white-brown ball was formed, in which the recovered oil was surrounded, and the ball was free of stickiness and fluidity. Since the latex was also present inside the ball, the hardness of the ball was higher than that in Experimental Example 1. This was because water was present inside the oil lump. The latex was thus dispersed in the water within the oil lump, so that the latex membrane was also formed inside the oil lump.

Experimental Example 3

The same sample as used in Experimental Example 2 was used, and 10 cc of a synthetic rubber latex (SBR (styrene/butadiene rubber) latex; Nipol#4850 manufactured by Nippon Zeon Co., Ltd.) was used.

This latex had a solid matter content of 70% and was stabilized by adjusting the pH to about 11. As a coagulant, 20 g of a mixture of 50% of ZnO and 50% of $Na_2SiF_6$ were used. A latex membrane was formed around the oil to form a ball. The sea water became transparent again after 75 seconds. The time required for the sea water to become transparent by the formation of a latex membrane is herein called "coagulation time".

Experimental Example 4

The same sample as used in Experimental Example 2 was used, and 10 cc of a synthetic rubber latex (isoprene latex; Kaliflex IR#700 manufactured by Shell Chemical Co., Ltd.) was used.

This latex had a solid matter content of 65%. As a coagulant, 20 g of a solution of 60 g of calcium nitrate dissolved in 100 cc of methanol was used. A latex membrane was formed around the oil to form a ball. The sea water became transparent again after 33 seconds.

Comparative Example 1

An experiment was performed under the same conditions (water temperature: 10° C.) as those in Experimental Example 1 except that no coagulant was used. In this case, the emulsion dispersed in the sea water remained milky state. The sea water did not return to a transparent state until a long time had passed. Thus, 5 days were required for the sea water to become transparent. In practice, the non-coagulated emulsion will diffuse into sea water by waves and currents. No satisfactory results are obtained.

EXAMPLE 2

C-Heavy oil was applied on a rock to form an oil film. The oil film-bearing rock was allowed to stand out door for 2 days (temperature: 0–10° C.). As a lipophilic emulsion, a mixed emulsion obtained by blending 100 parts by weight of a natural rubber latex, 2 parts by weight of nonylphenol ether and 2 parts by weight of polyoxyethylene alkyl ether, and then mixing the blend, with stirring, with 1.5 parts by weight of colloidal sulfur, 1.5 parts by weight of ZnO and 15 parts by weight of a spindle oil was used. The emulsion was applied onto the oil film with a brush.

Thereafter, an aqueous solution obtained by dissolving 20 parts by weight of $Na_2SiF_6$ and 15 parts by weight of sodium di-n-butyldithiocarbamate as a curing accelerator in 100 cc of warm water was scattered over the surface of the emulsion. As a result of the application of the emulsion, the oil film was solubilized and dissolved in the emulsion. The oil was coagulated by the coagulant to form a gel and was able to be removed from the rock.

In the case where a silicate compound such as the above $Na_2SiF_6$ is used as a coagulant, heating of the emulsion to about 50° C. with a hot wind or a hot water is effective to accelerate the coagulation because the coagulant is heat-sensitive. Thus, the coagulation proceeds more rapidly.

One preferred embodiment of the present invention is concerned with a process for recovering an oil, characterized by scattering a latex and a coagulant therefor over an oil-containing water, permitting the latex to diffuse around the oil in the water, and coagulating the latex with the coagulant for forming a coagulated latex membrane around the oil for the recovery thereof.

In this case, the process for recovering an oil may be characterized in that the latex is a natural rubber latex. Further, the process may be characterized in that the coagulant is a salt of Mg or Ca and in that the oil is a heavy oil or crude oil in sea water.

Moreover, the process for recovering an oil may be characterized by contacting an oil which deposits on a solid surface with a lipophilic polymer emulsion to solubilize the oil in the emulsion and, then, coagulating the emulsion to recover the oil.

In the foregoing description, the coagulant is a substance that shows the following function. Namely, the coagulant is a substance which can unstabilize a material which is homogeneously dispersed in a colloidal state in water as an emulsion and which is in a stable state. Thus, the coagulant is an unstabilizing agent and may be said as being a gelling agent or a flocculating agent.

The term "coagulation" is a phenomenon that a polymer in a latex is separated from the serum, forming a lump, where the serum loses polymer to become transparent or the serum does not completely lose polymer the concentration of which decreases. The polymer coagulated in this manner is referred to as coagulated substance or coagulum.

The term "gelation" is a phenomenon that a latex in a solution loses its fluidity and is solidified as a whole in a gelatin-like state in conformity with the shape of a vessel. The product is called gel. The gel thereafter shrinks so that a transparent serum is separated. This phenomenon is called syneresis.

The term "flocculation" is a phenomenon that fine agglomerates of polymer particles are formed in a large amount.

Chemicals which accelerate the destroy of a stable state of a normal emulsion such as a latex are herein referred to as coagulants or unstabilizing agents.

The concept of emulsion latex in the present invention will be described here. There are a variety of kinds of polymer emulsion latex. Various classifications are adopted therefor. As a rough classification, a classification as shown in Table 1 is adopted on the basis of the production methods or procedures for the production. In the present invention, the emulsion latex is a general term of materials in which a dispersed substance is a polymer and a dispersing medium is water or other liquids. Namely, the emulsion latex refers to a stable state of a polymer as a discontinuous phase with water or other liquid forming a continuous phase.

Industrial Applicability

As having been described in the foregoing, according to a process for the recovery of an oil of the present invention, it is possible to easily recover, for example, heavy oil or crude oil spills on the sea caused by accidents of tankers, recover oil deposits on rocks and seashores, recover oils leaked from oil tanks, and recover and remove oil deposits in tanks at the time of cleaning thereof.

TABLE 1

Classification of Emulsion-Latex According to Kind of Polymer

| Classification of Polymer | Classification of Composition and Short Name | Abbreviation | Common Name in Japan |
|---|---|---|---|
| Natural rubber | | NR | Natural rubber latex |
| Styrene-butadiene copolymer | Polybutadiene (styrene content: 0) | EBR | EBR latex |
| | Low styrene (styrene content: 5–40) | SBR | SBR latex |
| | Medium styrene (styrene content: 40–70) | SB | SB latex |
| | High styrene (styrene content: 70–95) | HS | High styrene latex |
| | Polystyrene (styrene content: 100) | PS | Polystyrene latex |
| Acrylonitrile-butadiene copolymer | Low nitrile (A.N. content: 18–24) | NBR | NBR latex |
| | Medium nitrile (A.N. content: 25–32) | | |
| | Medium high nitrile (A.N. content: 18–24) | | |
| Methyl methacrylate-butadiene copolymer | | MBR (ABR) | MBR latex |
| Polychloroprene | | CR | Chloroprene latex |
| Vinylpyridine copolymer | | VP | VP (vinylpyridine latex |
| cis-1,4-Polyisoprene | | IR | IR latex |
| Butyl rubber | | IIR | Butyl latex |
| Polyvulcanized rubber | | T | Thiokole latex |
| Polyurethane | | U | Urethane latex |
| Polybutene | | PIB | Polybutene emulsion |
| Polyacrylate | | AR, AM | Acrylate latex, Acryl emulsion |
| Vinyl chloride polymer | | PVC | Vinyl chloride (PVC) latex |
| Vinyl acetate polymer | | PVAc | Vinyl acetate latex |
| Vinylidene chloride polymer | | PVdC | Vinylidene chloride latex |
| Polyethylene | | PE | Polyethylene emulsion |
| Vinyl acetate ethylene copolymer | | EVA | Ethylene vinyl acetate emulsion |

Remarks: In addition to the above, there may be mentioned those materials which are obtained by copolymerizing trace components with the above various polymers and which are named to have an affix such as modified-, crosslinked-, self-crosslinked- or carboxy-.

What is claimed is:

1. A process for recovering an oil, comprising the steps of:
   scattering a natural rubber latex on sea water containing the oil, said natural rubber latex comprising a colloid containing, as main ingredients, cis-1,4-isoprene polymer and a protein;
   scattering bittern on said sea water;
   permitting said natural rubber latex to diffuse around the oil; and
   forming a membrane of said natural rubber latex around the oil.

2. A process for recovering an oil as recited in claim 1, wherein the step of scattering the natural rubber latex comprises scattering the natural rubber latex on sea water containing heavy oil or crude oil.

3. A process for recovering an oil as recited in claim 1, further comprising mixing said bittern with said natural rubber latex before the step of scattering said bittern and the step of scattering said natural rubber latex.

4. A process for recovering an oil as recited in claim 2, further comprising mixing said bittern with said natural rubber latex before the step of scattering said bittern and the step of scattering said natural rubber latex.

5. A process for recovering an oil as recited in claim 3, wherein the sten of mixing comprises mixing said bittern and said natural rubber latex such that a residence time of a mixture of said bittern and said natural rubber latex is shorter than a time required for a coagulation of said natural rubber latex caused by said bittern.

6. A process for recovering an oil as recited in claim 4, wherein the step of mixing comprises mixing said bittern and said natural rubber latex such that a residence time of a mixture of said bittern and said natural rubber latex is shorter than a time required for a coagulation of said natural rubber latex caused by said bittern.

7. A process for recovering an oil as recited in claim 1, wherein the step of scattering the natural rubber latex comprises scattering a natural rubber latex comprising a colloid containing 54% by weight cis-1,4-isoprene polymer, 2% by weight protein and 44% water.

8. A process for recovering an oil, comprising the steps of:
   contacting an oil, which coexists with sea water on a solid surface, with a natural rubber latex and a bittern, said natural rubber latex being a colloid containing, as main ingredients, cis-1,4-isoprene polymer and a protein;
   covering the oil with said natural rubber latex; and
   coagulating said natural rubber latex.

* * * * *